(12) United States Patent
Kobler

(10) Patent No.: US 8,262,529 B2
(45) Date of Patent: Sep. 11, 2012

(54) CONTINUOUSLY VARIABLE TRANSMISSION AND OPERATING METHOD THEREFOR

(75) Inventor: Peter Kobler, Regensburg (DE)

(73) Assignee: UMS Maschinenbau GmbH (DE)

( * ) Notice: Subject to any disclaimer, the term of this patent is extended or adjusted under 35 U.S.C. 154(b) by 892 days.

(21) Appl. No.: 11/989,559

(22) PCT Filed: Jul. 31, 2006

(86) PCT No.: PCT/EP2006/007575
§ 371 (c)(1),
(2), (4) Date: Dec. 29, 2008

(87) PCT Pub. No.: WO2007/012503
PCT Pub. Date: Feb. 1, 2007

(65) Prior Publication Data
US 2009/0197731 A1  Aug. 6, 2009

(30) Foreign Application Priority Data

Jul. 29, 2005 (DE) .......................... 10 2005 036 379
Mar. 3, 2006 (DE) .......................... 10 2006 010 453

(51) Int. Cl.
*F16H 3/70* (2006.01)
(52) U.S. Cl. ........................................ 475/170; 475/166
(58) Field of Classification Search .................. 475/162, 475/165, 166, 168–170
See application file for complete search history.

(56) References Cited

U.S. PATENT DOCUMENTS 3,229,549 A * 1/1966 Riedl et al. ....................... 74/640
5,674,144 A * 10/1997 Wiley ............................ 475/170

FOREIGN PATENT DOCUMENTS

GB 2259741 A * 9/1991

* cited by examiner

*Primary Examiner* — Justin Holmes
*Assistant Examiner* — Huan Le
(74) *Attorney, Agent, or Firm* — Pandiscio & Pandiscio

(57) ABSTRACT

The invention relates to a continuously variable transmission (1) comprising a driven rotary part (2), a chassis (4) or housing, and a driving rotary part (3). The invention also relates to an associated operating method whereby the driven rotary part (2) or the chassis (4) or housing is coupled to a first guide or drive module (5,5'). A second guide module (14) is also provided, the two guide or drive modules (5,5', 14) being connected to a chassis (4) or housing of the transmission (1) or an adjacent machine or installation part, such that the second guide module (14) can be displaced in relation to the first guide or drive module (5, 5'). Furthermore, the two guide or drive modules (5,5', 14) are coupled to each other by means of at least two mechanisms, each consisting respectively of a first coupling module (7a-7d) and a second coupling module (8a-8d) which are mounted (9a-9d) or guided against each other and/or can mesh with each other. A transport displacement of the deflection angle co of the rotary displacement of the first or second coupling module (7a-7d, 8a-8d) in question is cyclically transferred to another rotary part (18), and the rotary axes of the rotary connections of a free wheel (16a-16d) are aligned.

30 Claims, 13 Drawing Sheets

CONTINUOUSLY VARIABLE TRANSMISSION AND OPERATING METHOD THEREFOR

The invention relates to a continuously variable transmission and a method for the transfer of relative rotary movements between at least a first rotary part, in particular a drive shaft, ring or cylinder, and a chassis or housing on at least a second rotary part, in particular an output shaft, ring or cylinder.

Transformations of speed and torque are normally called transmissions. They make possible the transformation of a torque and a speed provided by a drive into a different torque, speed or torque-speed combination.

Such a transmission can be designed as a stepped transmission or as a stepless or continuously variable transmission, the stepped transmission having at least one predefined gear ratio, while the gear ratio of a stepless transmission varies continuously within a defined range. Stepped transmissions are realized as toothed gear transmissions, which achieve the predefined gear ratios by means of toothed gears of different radii, which work together as a unit within the transmission. Such stepped transmissions do have a high degree of efficiency (>90%) and a simple technical design, as well as a high power density, but due to their toothed gears they have the disadvantage that they cannot be shifted under drive load (torque), i.e., the selected gear ratio is not variable under load. In order to vary the gear ratio, it is necessary to interrupt the thrust of the drive, which is done using a clutch device.

Continuously variable transmissions, by contrast, are designed as friction wheel or belt drive transmissions. Their advantage over stepped transmissions is that they can vary the gear ratio without an interruption in thrust. Because of the construction of such continuously variable transmissions, the torque is transferred from the drive to the output by means of a relatively small-surface transfer mechanism. The transfer mechanism in the power flow, e.g., friction wheels or thrust belts, thus tend to skid on the contact surfaces, i.e., there is slip. Thus, only a limited torque can be transmitted with a conventional continuously variable transmission, i.e., the efficiency can be less than 50%. What is more, the wear on the power transfer components is increased, which means increased maintenance requirements.

A continuously variable transmission with a drive shaft is known from DE 102 34 463 A1, in which the transmission has an elongated perforated disk provided with at least two elongated holes, which is directly or indirectly coupled with the drive shaft. Furthermore, at least two levers are mounted and guided in the elongated holes of the elongated perforated disk and at least two excentrically fastened oval disks are arranged on the levers. At least one shaft, on which the oval disks are guided, and which exhibit at least one freewheel, are provided in the same way as a freewheel housing, in which at least one freewheel engages and which is directly or indirectly coupled with the drive shaft. This transmission does achieve a continuously variable change in the output speed. One disadvantage is that in this embodiment, the excentric ends of the bolts are not mounted on a slotted disk interacting with it, but rather are movably guided in the axial direction. The guidance of swiveling bolts, which does not completely define the distances between an excentric anchoring and the displaceable axis of the output shaft, but rather makes it dependent on other transmission elements, can only show a very small contact or transfer surface, which allows only low torques; this disadvantage is thus linked with the fact that the individual bolts always have the same distances from the excentrically displaceable output shaft.

The device according to DE 36 05 211 A1 suffers from a similar problem. This describes a transmission for the continuous variation of a rotational speed under full load, in which an internally toothed ring is rigidly connected with the output shaft. In this toothed ring, paddles are mounted on the same shaft, each of which has a catch on its outside end, thus an outward projecting, rotating extension with a more or less sharp edge on the outside end to engage with the internally toothed ring. Furthermore, a lever is jointed on the free ends of the paddles whose other end is excentrically mounted on a disk that is rigidly connected with the drive shaft. In a neutral position, the drive shaft is aligned with the output shaft; the catches engage in the sawtooth-shaped internal gearing and drive it; the drive and output shafts rotate at synchronous speed. If the drive shaft is excentrically displaced with respect to the output shaft, then the paddles are set to unequal rotary speeds for a rotation; the catch that advances the fastest remains engaged and drives the output shaft, while the others remain back along the internal gearing. The speed can thus be varied depending on the displacement of the drive shaft from the center point. Each paddle, together with its lever rod, forms a knee joint whose bending during a rotation of the drive and output shafts running opposite one another is periodically increased and reduced (extended) again. The rotary motion is picked up at the knee joint that exhibits the greatest angular velocity due to the overlay of the rotary motion and bending/extension motion. For this reason, since, in addition to the jointed connection, catches must be mounted on these knee joints with high precision, the lever and paddle must be designed with a high degree of stability. Since the knee joints are not free from external forces in this way, but rather become an integral part of the energy transfer, the mechanism is not only very complicated but also susceptible to problems. Even the slightest deformation of the paddle or lever rod can cause the catches not to work precisely. Finally, the range of adjustment is relatively small in both of the transmissions discussed above, since the maximum rotational speed that can be attained at the output shaft in addition to the synchronous speed is only a fraction of the drive speed.

These disadvantages to the described state of the art result in the problem initiating the invention, to develop a continuously variable transmission such that a stepless variation of the gear ratio is possible under load within wide limits. The mechanical effort should be minimized here wherever possible in order to keep the production costs within economically feasible limits, while at the same time the functional reliability should be maximized in order to reduce susceptibility to error.

The solution to this problem is found in a continuously variable transmission according to the main claim.

The invention is based on a design in which at least a first and a second coupling module form a coupling mechanism, the first coupling module being coupled with a first guide or drive module having a defined excentricity with respect to its rotational axis and the second coupling module being mounted or jointed on the second guide module. All internal transmission movements are thus attributable to easily controllable swivel movements. This is achieved due to the stated use of two coupling modules per coupling mechanism, which are capable of a relative movement and are thus able to react to different distances between the connecting points of a coupling mechanism at the two guide parts due to a change in structure, such as the bending angle of a knee joint. The individual coupling mechanisms are not, however, directly coupled with one another, either in the region of their knee joint or by direct excentric coupling to a rotary part turning with them.

According to the invention, a first or second coupling module of each coupling mechanism is directly or indirectly connected or directly or indirectly coupled with at least one freewheel, another connection of the (at least one) freewheel being directly or indirectly coupled with the second shaft, specifically in such a way that the transport movement of the deflection angle of the rotary motion of the relevant first or second coupling module is transferred cyclically to the second shaft or to a rotating part coupled with it. The freewheels can be configured differently, preferably as clamping body freewheels provided with multiple clamping bodies equidistantly distributed around the circumference, or as ratchet freewheels with multiple ratchets, which can be swiveled in and out radially, equidistantly distributed around the circumference, or as sawtooth freewheels with a first, toothed disk and multiple sawteeth, which can move axially with respect to the disk, distributed equidistantly along the circumference of the first disk, in the form of a ring of sawteeth pointing the opposite direction, for example, arranged circumferentially on a second disk, which engage with the sawteeth situated opposite them in case the direction of rotation is blocked, but can slip along in the freewheel direction of rotation. Common to these freewheels, however, is a structure with two rotationally symmetrical elements, which can rotate around their rotational axes, which are aligned with one another; rotation in one direction is inhibited, however.

The resulting, combined rotary motion of all coupling mechanisms is due to a differential transmission module, where it is counter-coupled with the drive speed or a portion thereof (preferably <1, but possibly also >1), in order to expand the adjustment range, i.e., the ratio of the maximum output speed to the minimum output speed for the same drive speed. To this end, the differential transmission module is also coupled with the drive and output shafts. Due to such a counter-coupling with the full drive speed, the output shaft remains at a standstill during synchronous operation, thus the minimum output speed is zero, and the adjustment range is thus infinitely large. In a preferred embodiment, the differential transmission module comprises two differential ring gears, each with a toothed ring on their interior sides, which face one another, and from a differential cage arranged between them, which are in permanent engagement with the first and second differential ring gears. The first differential ring gear is connected with the freewheels, for example. The differential cage can—possibly by means of a reversing transmission—be coupled with the drive or output shaft, in which case the other differential ring gear is coupled with the other connecting shaft. Instead of such an "axial" differential, a "radial" differential can also be used, which corresponds to a planetary transmission with sun gear, ring gear and planet gears.

Advantageous is the first guide or drive module of the continuously variable transmission mounted rotationally around the axis of rotation with respect to the transmission chassis or housing and/or (rotationally) drivable by the first shaft, for example by a toothed gear connected with the first shaft, which meshes with the gear toothing on the first guide or drive module.

In one embodiment of the continuously variable transmission, the first guide or drive module is designed at least segmentally in disk shape, the rotational straight line running approximately perpendicular to the base plane crossing the first guide or drive module designed in disk shape. The first guide or drive module exhibits at least two disk-shaped segments here, which are arranged parallel to one another and/or at a defined distance from one another. In a preferred embodiment, the two disk-shaped segments of the first guide or drive module, which are arranged parallel to one another, are connected with one another in a rotationally fixed manner, at least one sleeve element to be provided, arranged parallel to the axis of rotation, for a rotationally fixed connection. The sleeve element is alternatively arranged either in the rotational center or in the edge area of the two disk-shaped segments. Several coupling modules are excentrically attached, specifically mounted or fastened, to this first guide or drive module, hereafter referred to as pivot points.

The second guide module advantageously exhibits a rotationally symmetrical guide surface, which can be curved convexly, for example, in particular cylindrically, similar to a guide axis, or curved concavely, especially with a hollow cylindrical shape like an eye. This rotational axis forms a star point axis shared by all attached coupling modules, hereafter referred to as the star point.

The second guide module is furthermore adjustable with respect to the rotational axis of the first guide or drive module, preferably in displaceable design. Especially preferred for this purpose, the second guide module—and thus the star point—can be moved in a plane with respect to the housing, running perpendicular to the rotational axis of the first guide or drive module, so that the distances between the star point and the various excentric pivot points are always defined and set in advance.

The second guide module can in particular be designed to be displaced radially, specifically with respect to the rotational axis of the first guide or drive module, the second guide module again being adjustable and in particular moveable with respect to the transmission chassis or housing.

A first and second coupling module advantageously forming a coupling mechanism are guided or mounted to each other or rotationally fastened with one another such that a change in the distance of the rotational axis of the first guide or drive module and the rotational axis of the second guide module results in a relative displacement at least of the first or second coupling module around its rotational axis.

The first coupling module of a coupling mechanism is preferably coupled with the first guide or drive module, specifically in such a way that the first coupling module crosses at least one of the disk-shaped segments of the first guide or drive module excentrically to its rotational axis.

In an especially preferred embodiment, the first coupling module of each coupling mechanism, coupled with the first guide or drive module, is designed as a transmission module, which in at least one of the disk-shaped segments of the first guide or drive module excentric to its rotational axis is swivel-mounted around a rotational axis.

The disk-shaped segments of the first guide or drive module have recesses, which are preferably designed in the shape of a regular cylinder, to accept a transmission module.

Furthermore, a transmission module can comprise a transmission rod and a drive lever rigidly connected with it or can exhibit a transmission disk or transmission cylinder.

Advantageously, a second coupling module, coupled with the second guide module exhibits a surface complementary to its rotationally symmetrical guide surface.

In an especially preferred embodiment, a second coupling module, coupled with the second guide module, is designed as a drive lever, the drive lever of each coupling mechanism being swivel-mounted, independent from one another, around the rotational axis of a rotationally symmetrical guide surface of the first guide module. The drive levers each exhibit a bearing sleeve particularly for the independent swivel-mounting around the rotational axis of a guide surface, particularly a guide axis.

For the independent swivel-mounting around the guide axis, the drive levers each exhibit sleeves of different cross sections in the second guide module, arranged in a bearing star point and projecting perpendicular to the drive lever, which preferably engage with one another.

On each first coupling module, particularly transmission module, coupled with the first internal guide or drive module, a surface is provided excentrically to its rotational axis for coupling with the second coupling module, particularly drive lever, which runs parallel and/or perpendicular to the rotational axis. The surface of the first coupling module, particularly transmission module, coupled with the first internal guide or drive module is designed as a rotationally symmetrical joining surface for coupling with the second coupling module, particularly drive lever. The rotationally symmetrical joining surface can be convexly curved, particularly cylindrically, like a connecting axis, or concavely curved, particularly hollow cylindrically, like a connecting eye.

The first coupling modules, particularly the transmission modules, which are designed, for example, as circular openings or as elongated holes, coupled with the first guide or drive module, advantageously exhibit at least one guide opening to accept at least one pin element permanently connected with the its second coupling module.

The center axis of the guide openings preferably runs parallel to the rotational axis of the first guide or drive module, particularly its disk-shaped segments.

Furthermore, a surface that is complementary to the rotationally symmetrical joining surface is provided on its second coupling module, particularly drive lever.

The guide openings, designed as elongated holes, of a transmission module are, for example, connected with the associated second coupling module, particularly drive lever, by means of at least one guide element.

The surface of the first coupling module, particularly transmission module, coupled with the first internal guide or drive module is designed as a row of teeth or friction surface for coupling with the second coupling module, particularly drive lever.

The first coupling module, particularly transmission module, coupled with the second guide or drive module, is designed to engage in the row of teeth of the associated second coupling module, particularly drive lever.

In an advantageous embodiment, the rotary movements generated by the at least two coupling mechanisms are combined beyond the connected freewheels, the freewheels being arranged in such a way with respect to one another that the fastest rotary motion in a commonly oriented direction of rotation is always transmitted. Toothed planet gears at the output end of the freewheels, which all mesh with a common, toothed sun gear, are especially well suited for this.

With the transmission according to the invention, the knee joint of the described coupling mechanisms can only be defined by the intersection or connection point of two coupling modules, which are rotationally mounted, for example, with their other connection points each to a guide module, without forces from a third side acting on the specific knee joint.

Furthermore, it is of particular importance that due to the described guidance or mounting or coupling of the two coupling modules of a coupling mechanism, a change in the distance between the relevant joint point or the rotational axis on the first guide or drive module and the star point on the second guide module results in a relative twisting of at least one coupling module around its joint or rotational axis on the corresponding guide module, which is then picked up and influences the rotation of the output shaft.

It is also important that the knee between the two coupling modules of a coupling mechanism revolves around a central area of the two guide modules. This is achieved with a knee formed by a joint in that the sum of the distances $d_1$, $d_2$ of this knee joint from the respective other anchor points of the two coupling modules, the star point on one side and the excentric joint point on the other side, is always greater than the maximum adjustable excentricity e between the two guide modules: $e < d_1 + d_2$.

In order to prevent a non-circular, i.e., vibration-laden operation of the transmission according to the invention, at least one coupling module per coupling mechanism can be designed as a disk or cylinder and/or exhibit a counterweight.

The gear ratio of the continuously variable transmission according to the invention can be changed under full load. The transmission is therefore especially suitable for heavy-duty drives, such as in locomotives, commercial trucks, heavy-duty machine tools and wind power machines. In the low to medium load range, it can also be used for, among other things, automobiles, motorcycles and heat pumps.

Other features, properties, advantages and effects based on the invention arise from the following description of preferred embodiments of the invention and from the drawing. In the drawings:

FIG. 7b shows a representation corresponding to FIG. 2b of the transmission from FIG. 7a.

Figure 1:
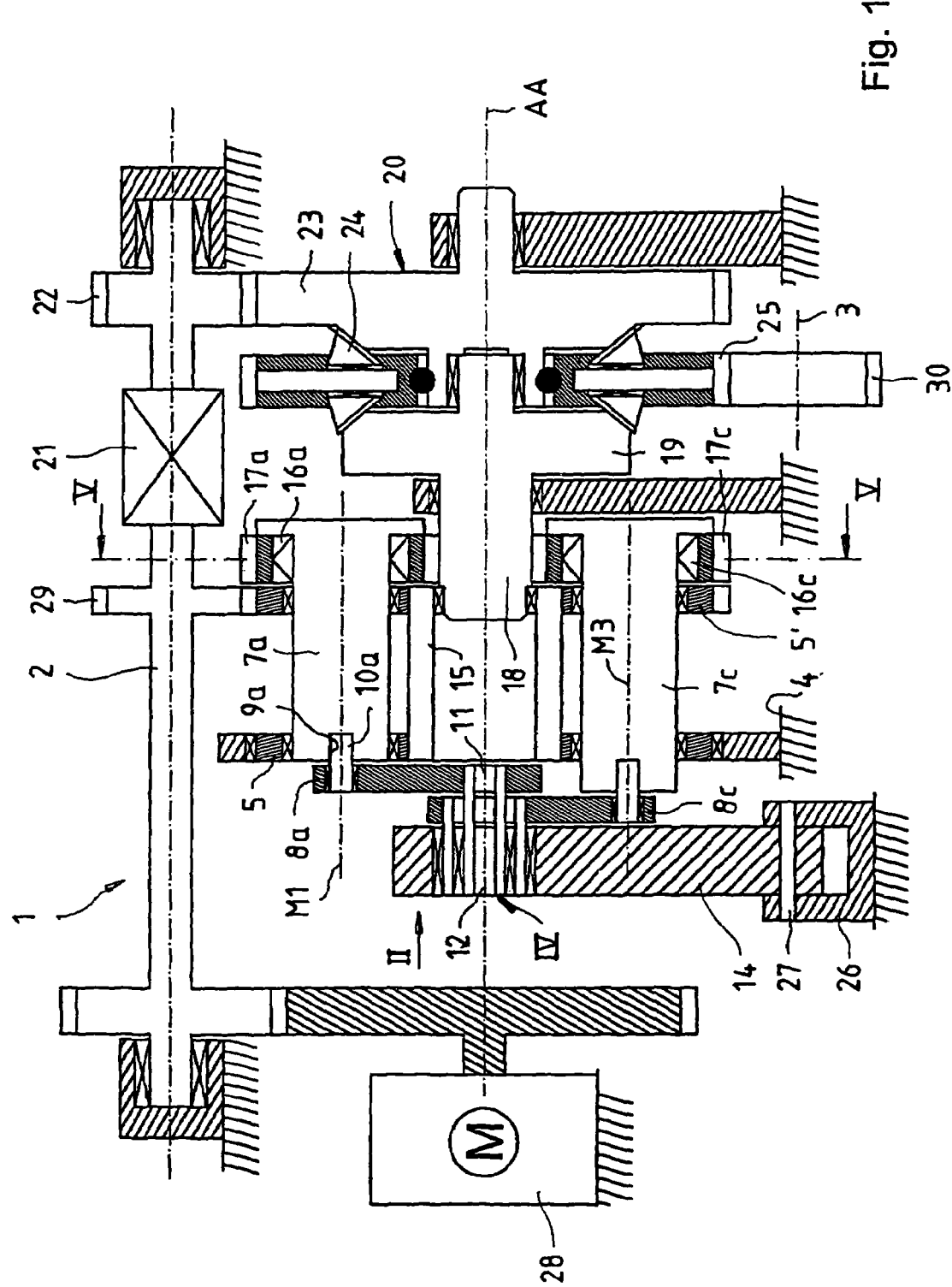
FIG. 1 is a section through a transmission according to the invention.

The continuously variable transmission 1 serves to transform the rotational speed of a drive shaft 2 to a variable rotational speed of output shaft 3. To this end, a swivel-mounted guide or drive module, preferably in the form of a disk 5 coupled with the drive shaft 2, for example by means of a first toothed wheel that meshes with the external toothing on the disk 5, is on a chassis 4, preferably provided, connected or combined with a housing.

The driven disk 5 exhibits a first and a second recess 6, preferably designed in the shape of a regular cylinder and arranged at equal distances along a circle around an axis running parallel to the drive axis AA of the transmission 1, for example lying opposite one another by diameter. In a preferred embodiment, first through fourth recesses 6a-6d are provided, which are preferably designed as round cylindrical openings, their center point axes M1-M4 being oriented parallel to the drive axis AA of the transmission 1 and preferably symmetrical to a center point M located on the drive axis AA, which functions at the same time as the rotational center of the drive disk 5. The distances from their center point axes M1-M4 to the center point M of the drive disk 5 preferably all correspond to one another, or only correspond in pairs or are all different from one another. The center point axes M1-M4 of the four recesses 6a-6d are displaced with respect to the central axis AA preferably by 90° from one another.

The recesses 6a-6d exhibit identical, paired or different radii r1-r4. In each of these four recesses 6a-6d a first through fourth coupling module is housed, swivel-mounted around the relevant center axes M1-M4, preferably transmission modules 7a-7d, which in a preferred embodiment are designed as transmission rods, tubes, disks or cylinders. The coupling modules or transmission modules 7a-7d are each swivel-mounted in one of the recesses 6a-6d, specifically around the center point axes M1-M4 located there. For the rotational mounting of the transmission modules 7a-7d in the recesses 6a-6d, needle bearings or similarly bearing elements, for example, can be provided.

Furthermore, the coupling modules or transmission modules 7a-7d are each connected with a further coupling module, for example a drive lever 8a-8d, specifically, for example, swivel-mounted or guided. Each coupling module 7a-7d, together with another coupling module 8a-8d, forms a coupling mechanism.

In the embodiment according to FIG. 1, the transmission modules 7a-7d are each designed as round cylindrical transmission disks or transmission cylinders, for example from the shape of a tube sleeve element with a massively circular disk-shaped front side.

Figure 3A:
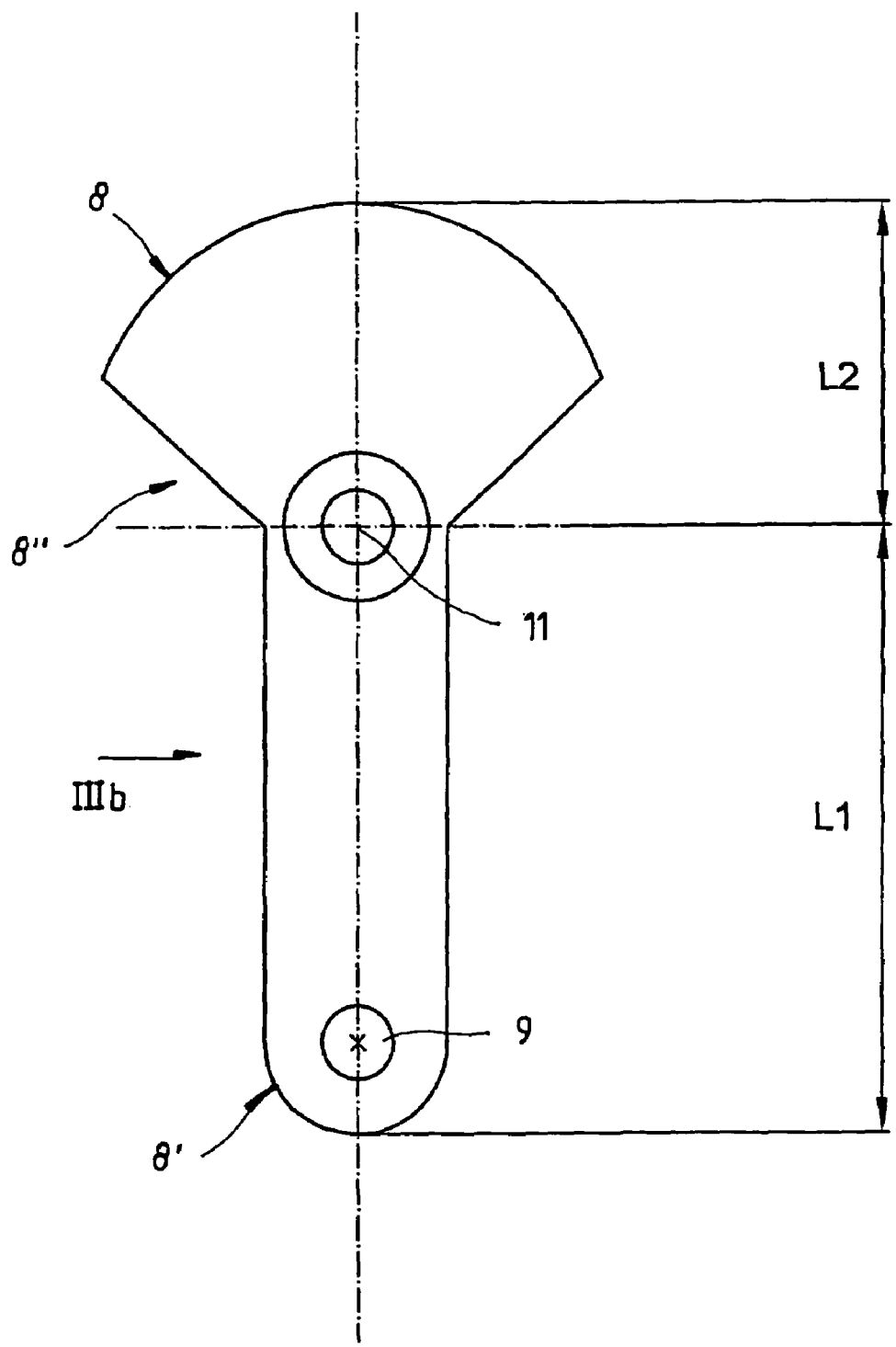
FIG. 3a shows detail IIIa from FIGS. 2a and 2b.
Figure 3B:
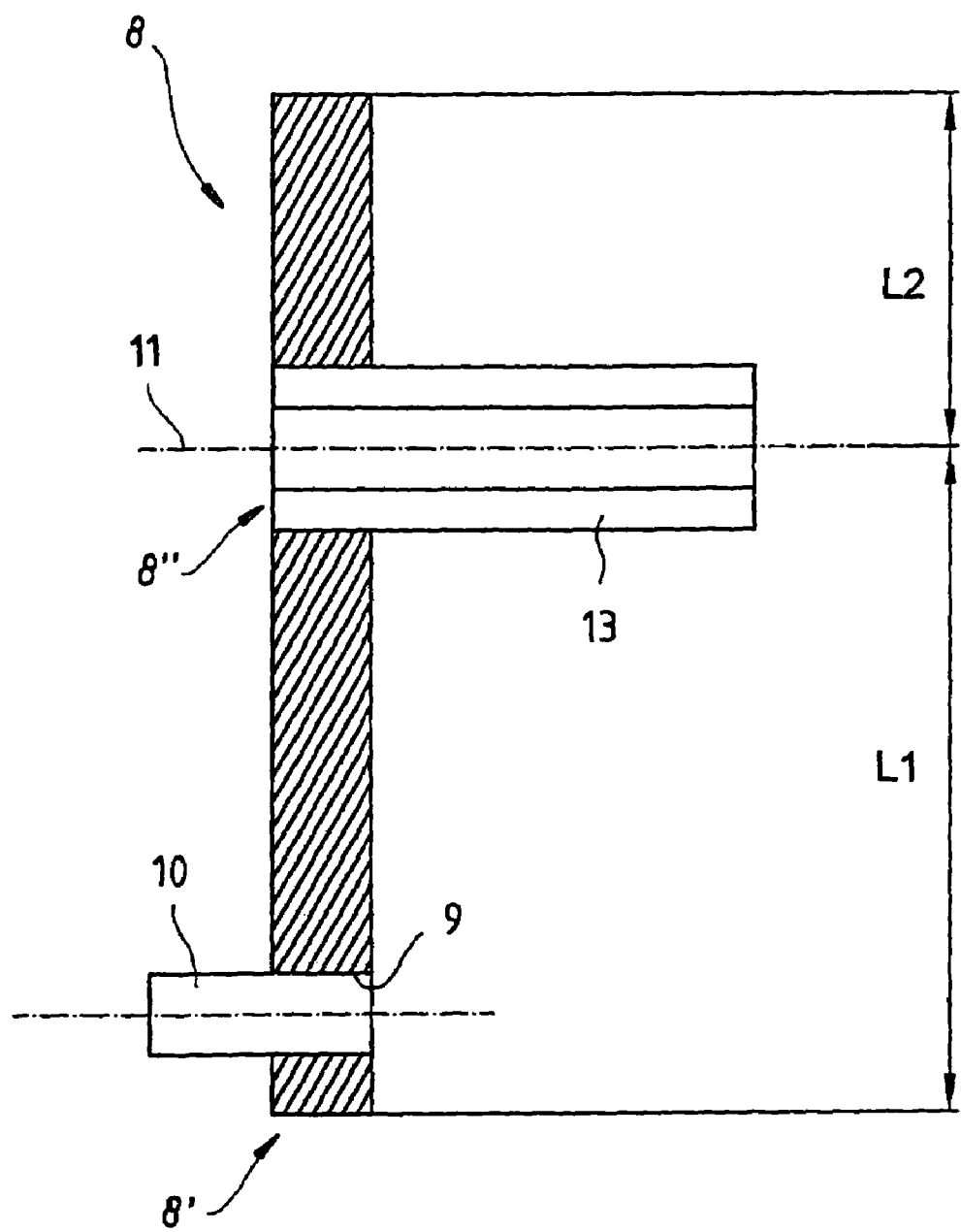
FIG. 3b shows a side view of FIG. 3a in the direction of arrow IIIb.
Figure 4:
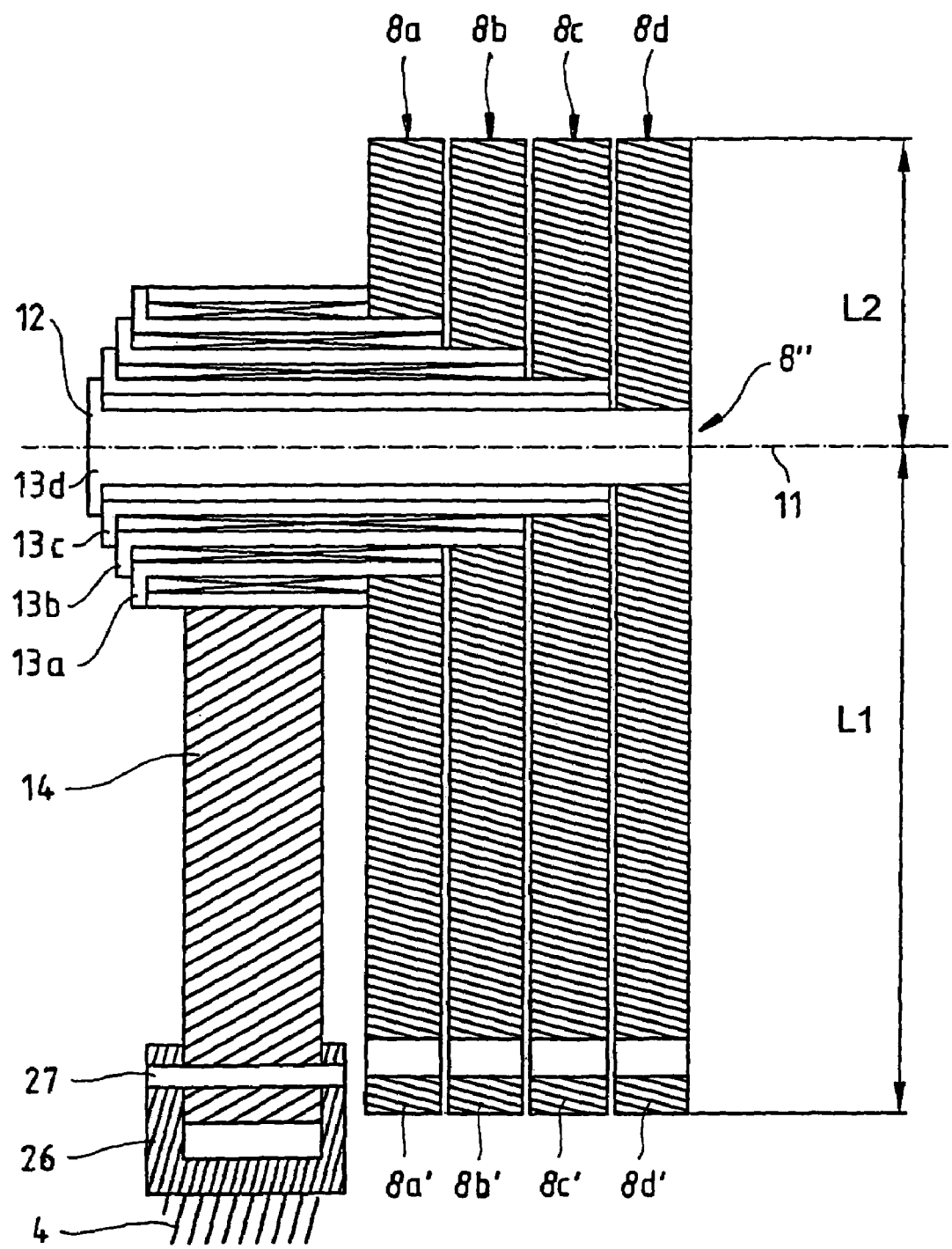
FIG. 4 shows detail IV from FIG. 1 in an exemplary schematic representation of the structure and the rotational mounting of individual drive levers with guide levers.
Figure 5:
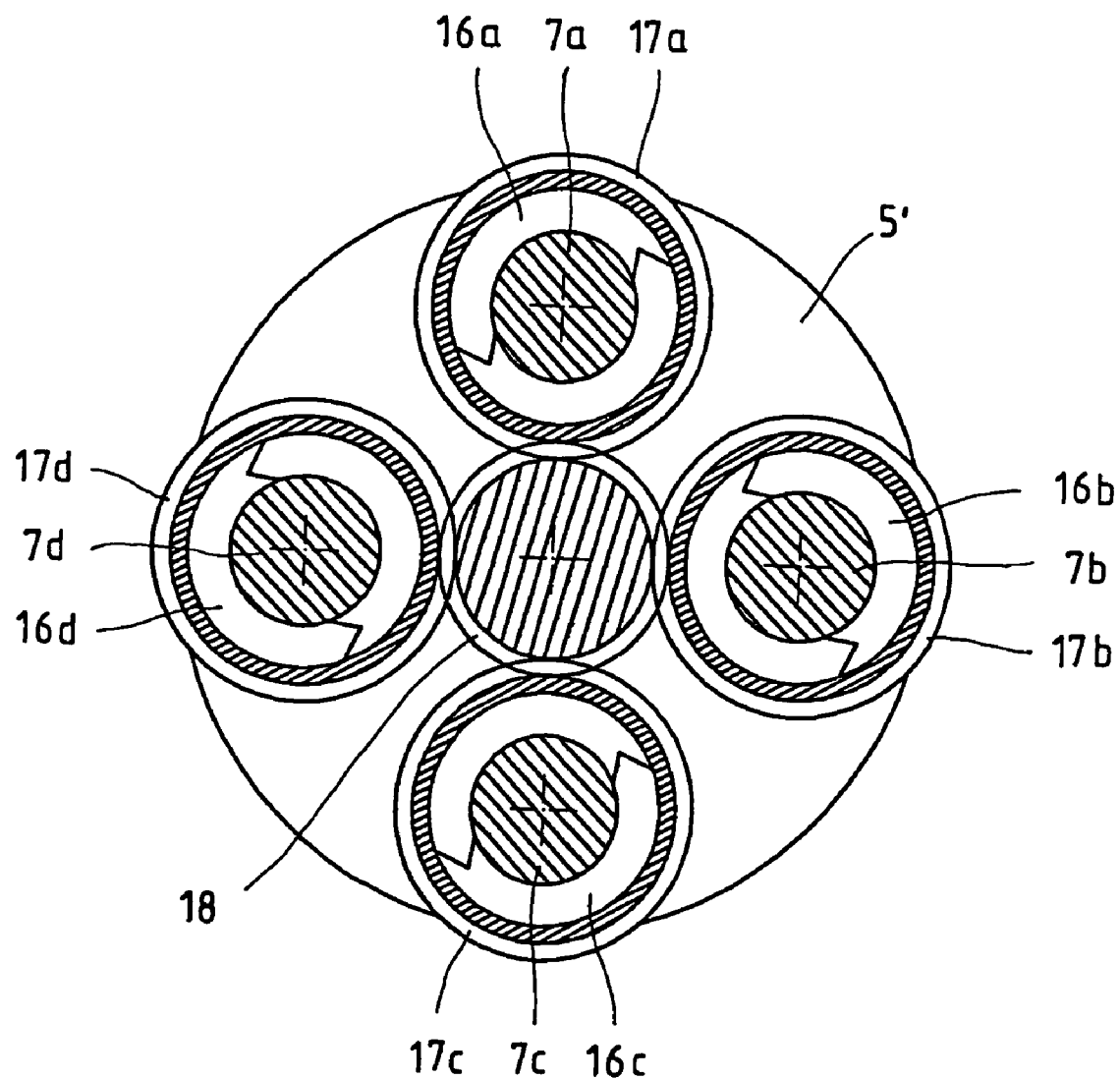
FIG. 5 shows a section through FIG. 1 along the line V-V.

To fasten a drive lever 8a-8d, as shown for example in FIGS. 3a and 3b, to a transmission disk 7a-7d, on the front side at a distance d1-d4 from the relevant center point axis M1 to M4 and thus excentrically a guide opening 9a to 9d is provided to house a pin element 10a-10d, which there serves to transmit the torque forces during the operation of the transmission.

The second lever end of each of the drive levers 8a-1d [sic] is guided to a common bearing star point 11, the drive levers 8a-8d being mounted in the bearing star point 11 independently of one another and with swivel motion. In the bearing star point 11, a guide shaft 12 is provided running parallel to the drive axis AA, around which the drive levers 8a-8d are swivel-mounted.

The drive levers 8a-8d exhibit a sleeve 13a-13d projecting vertically in the direction of the bearing star point 11, preferably with integrated bearing elements, which can be inserted in one another, since the diameter of the sleeves 13a-13d of the drive levers 8a-8d are designed differently.

FIGS. 3a and 3b show one of the drive levers 8a-8d. A drive lever 8a-8d exhibits a first lever segment 11 and a second lever segment 12. The second lever segment 12 exhibits, in a preferred embodiment, a counterweight, such as is often used in crank gears. As a result of the counterweight, the drive levers 8a-8d are balanced with respect to the bearing star point 11, so that a practically vibration-free operation of the entire lever arrangement is possible. Particularly for the operation of the continuously variable transmission 1 at high speeds, such a radially symmetrical balancing of the drive levers 8a-8d around the bearing star point 11 is recommended.

In an alternative embodiment, each drive lever 8a-8d exhibits an eye in place of the sleeves 13a-13d engaging in one another, which has the same diameter and surrounds a central guide axis as a bearing star point 11.

The sleeves 13a-13d or eyes are thus mounted on the bearing star point 11, which is designed as a guide sleeve or guide shaft 12 of a guide lever 14. The latter is anchored, allowing swiveling or displacement, on the transmission housing and has the function of fastening the shared bearing star point 11 of the drive levers 8a to 8d on the one hand and on the other hand offers the ability to influence its position, i.e., in particular to swing or move in order to deflect it from the center point M or from the drive axis AA of the drive disk 5. The deflection can occur along a plane running perpendicular to the drive axis AA, in particular along a line or circle.

As can be seen from the drawing, the transmission modules 7a-7d can be mounted in two drive disks 5, 5' parallel to one another. The two drive disks 5, 5' are designed congruent to one another and are joined with one another in a rotationally fixed manner by means of a preferred central sleeve 15. Also the second drive disk 5' thus exhibits first and second or first to fourth recesses 6a'-6d', in which the transmission modules 7a-7d are swivel-mounted. Through the distance D between the two disks 5, 5', which approximately correspond to the length of the connecting sleeve 15, acting tilting moments are diverted to the transmission modules 7a-7d as a result of the excentric coupling of the drive levers 8a-8d.

Furthermore, each transmission module 7a-7d is directly or indirectly coupled to at least one freewheel. Simple freewheel clutches working in one direction, e.g., roller-type freewheels, are suitable for this. Alternatively, reversible freewheel clutches in each working direction (e.g., ratchet freewheels) can be used. Hydraulic freewheel clutches and/or externally switchable and/or controllable electromagnetic clutches can also be provided.

The coupling between the transmission modules 7a-7d and the freewheels 16a-16d can be designed as a direct rigid connection, so that one ring of each freewheel 16a-16d always experiences the same rotary speed as the associated transmission module 7a-7d. Instead of this, the coupling can also occur by means of a transmission, so that the speed of a ring of each freewheel 16a-16d is always proportional to the speed of the associated transmission module 7a-7d, but preferably significantly greater than the latter, for example at least twice as great. Since such a speed transmission accompanies a torque transmission, the torques to be transmitted from a freewheel in the locked state can thus be significantly reduced, so that its load and thus also its size are considerably lowered. Such a coupling can take place by means of one or more planetary transmissions, for example.

The rotary motions of the transmission modules 7a-7d are largely decoupled by these freewheels 16a-16d. On the other side of each of these freewheels 16a-16d there is a toothed planet gear 17a-17d. These planet gears 17a-17d all mesh with a shared sun gear 18.

This sun gear 18 is coupled or connected in a rotationally fixed manner with a first connection of a differential transmission module 20, preferably with a first differential ring gear 19. The first differential ring gear 19 is here shown swiveling around the drive axis AA of the drive disks 5, 5'.

The rotary movement of the drive shaft 2 is transmitted by a reversing transmission 21 and a toothed gear 22 to another connection of a differential transmission module 20, preferably to a second differential ring gear 23. Such a second differential ring gear 23 can be designed as the mirror image of the first differential ring gear 19 and is likewise arranged to swivel around the drive axis AA of the drive disks 5, 5'.

Between the two differential ring gears 19, 23, a carrier or differential cage 25 is arranged in circular form is and equipped with toothed bevel wheels 24; the bevel wheels 24 are permanently engaged with both differential ring gears 19, 23.

As an alternative to an axial differential, in which the differential ring gears 16, 23 that rotate opposite one another are displaced in the axial direction opposite one another, a radial differential in the form of a planetary transmission can be used for counter-coupling of the input speed; its sun gear can correspond to the one differential ring gear and the ring gear to the other differential ring gear, while in such a case the planet gear carrier can fulfill the function of the differential ring cage.

The transmission 1 according to the invention functions as follows:

By adjusting the guide lever 14, for example, in the azimuthal direction around its bearing block 26, the bearing star point 11 is first set so that the center point M of the drive disk 5 and the bearing star point 11 of the drive levers 8a to 8d lie in a common alignment. This is possible because the bearing star point 11 and the center point M of the drive disk 5 exhibit the same radial distance from the swing axis 27 of the bearing block 26.

If the transmission 1 is now driven by a motor assembly 28, the distance of the bearing star point 11 with respect to the center point axes M1-M4 of the transmission modules 7a-7d does not change during a revolution of the driven disk 5, and as a result, each individual drive lever 8a to 8d undergoes a constant rotation movement around the axis AA according to the rotation speed of the drive disk 5, i.e., while the drive disk 5 is rotating, the transmission modules 7a-7d each remain in the same relative position with respect to the rotary axis AA and undergo no rotary movement of their own.

Figure 2A:
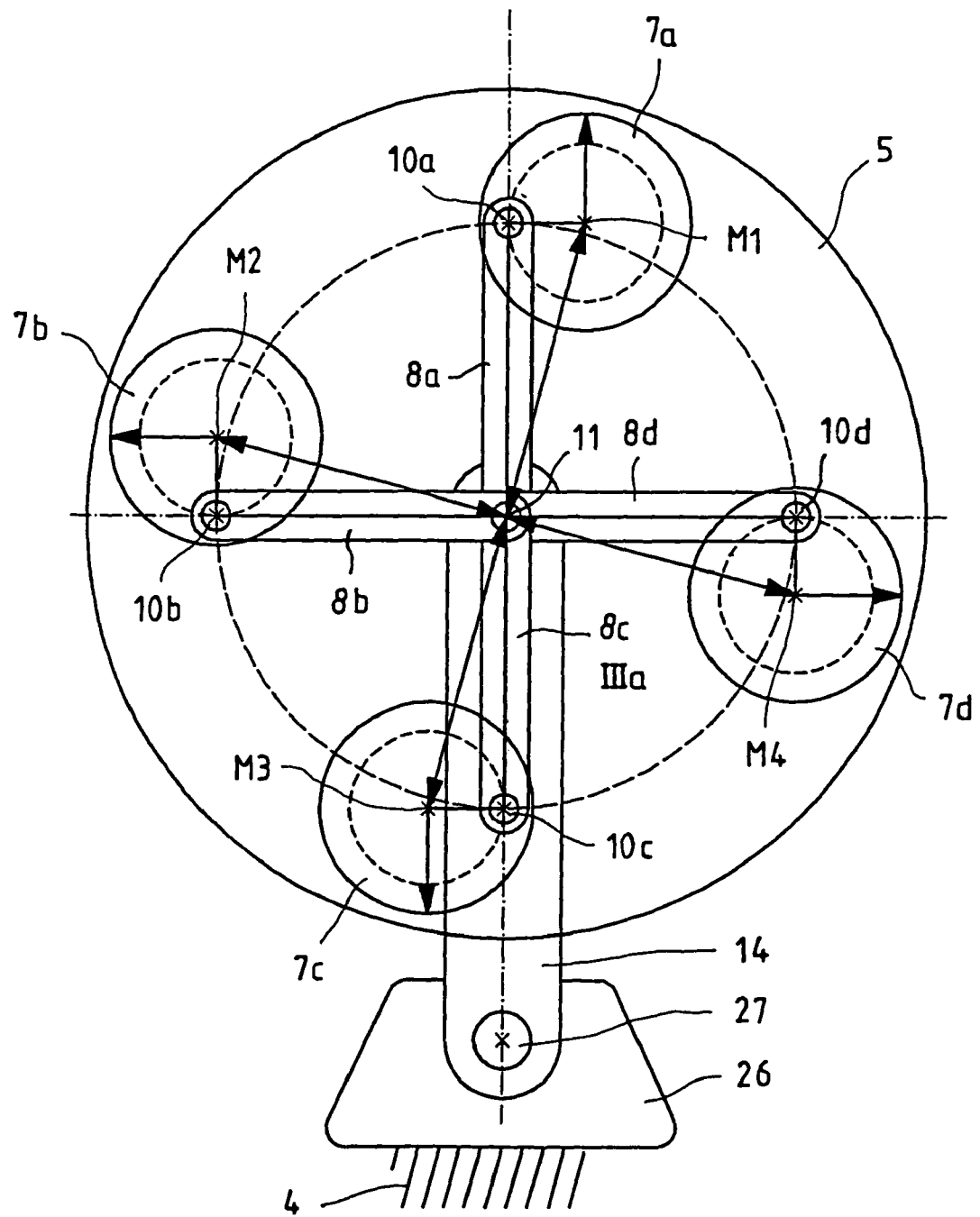
FIG. 2a is a view of FIG. 1 in the direction of arrow II, the transmission being set to a first gear ratio at which the output shaft is at a standstill.

For this case, the drive disk 5 is shown in FIG. 2a with the recesses 6a-6d and the transmission disks 7a-7d that are rotationally mounted in them. In this operating state, all drive levers 8a-8d rotate around the bearing star point 11 with the rotary speed of the drive disks 5, 5'. The transmission modules 7a-7d do not undergo any rotary motion around their center point axes M1-M4. The planet gears 17a-17d thus undergo no rotary motion of their own as well and the sun gear 18 that meshes with them revolves synchronously with the drive disk 5.

The gear ratio from the drive shaft 2 through the drive disk 5 to the first differential ring gear 19 is equally countered by the gear ratio from the drive shaft 2 through the reversing transmission 21 to the second differential ring gear 23. This is the case, for example, when the drive disk 5 has the same diameter as the differential ring gear 23 and the toothed gears 29, 22 meshing with it on the drive shaft 2 are equally large and the reversing transmission 21 has a gear ratio of −1.

The two differential ring gears are thus exactly equal in speed, but in opposition to one another. As a result, the differential cage 25 undergoes no rotary movement, due to the engagement of the bevel gears 24 with the two differential ring gears 19, 23, i.e., it is (nearly) at a standstill.

In the said position, the guide lever 14 is in its base position, i.e., the gear ratio realizable by the continuously variable transmission 1 equals zero.

The total gear ratio between drive shaft 2 and output shaft 3 when the guide lever 14 is in its base position can also be set differently in advance due to a different dimensioning of the reversing transmission 21 and/or the toothed gears 22 and/or 29, for example, comparable to the first or starting gear of a transmission provided with a clutch.

In order to vary the gear ratio during operation, the guide lever 14 is swiveled around its bearing axis 27 on the bearing block 26 in such a way that the bearing star point 11 is deflected with respect to the center point or rotational center M of the drive disk 5 and is located outside the drive axis AA.

Now cyclical pulse motions of the transmission disks 7a-7d are generated, which bring about additional rotary movements on the first differential ring gear 19 by means of the transmission modules 7a-7d or the freewheels 16a-16d associated with them, which add to or subtract from the speed of the drive disk 5. Since the second differential ring gear 23 is driven in counter rotation to the differential ring gear 19, the rotary motion transferred via the drive shaft 2 and the toothed gear 29 to the drive disk 5 to the first differential ring gear 19 is again filtered out subtractively and only the additional rotary motion on the differential cage 25 generated via the transmission modules 7a-7d and dependent on the deflection of the guide lever 14 prevails. To transfer this "differential rotary motion" to the output shaft 3, the differential cage 25 is, for example, directly or indirectly connected to the output shaft 3 by means of another toothed gear 30. There is thus a gear ratio unequal to zero, preferably greater than zero.

By displacing the guide lever 14 or changing the distances a, b, c, d between the bearing star point 11 or the rotational center of the drive levers 8a-8d and the center points or center axes M1-M4 of the transmission modules 7a-7d provided in the recesses 6a-6d of the drive disk 5, the rotary path of the drive disk 5 is converted into individual rotary paths, which are displaced in time counter to one another or asynchronous, of the drive levers 8a-8d and the transmission modules 7a-7d connected with them by the radial displacement, for example, of the bearing star point 11 of the drive levers 8a-8d. This generates a relative displacement between the drive levers 8a-8d and the transmission modules 7a-7d in each coupling mechanism.

As a result, each drive lever 8a-8d cyclically becomes faster or slower with a 360° rotation of the drive disk 5 within a specific angle range. The fastest drive lever 8a-8d drives the transmission module 7a-7d to which it is connected, with the associated freewheel 16a-16d and thus determines the gear ratio. In particular, this causes a change in the angle $\alpha, \beta, \gamma, \delta$ encompassed by two drive levers 8a-8d respectively.

Figure 2B:
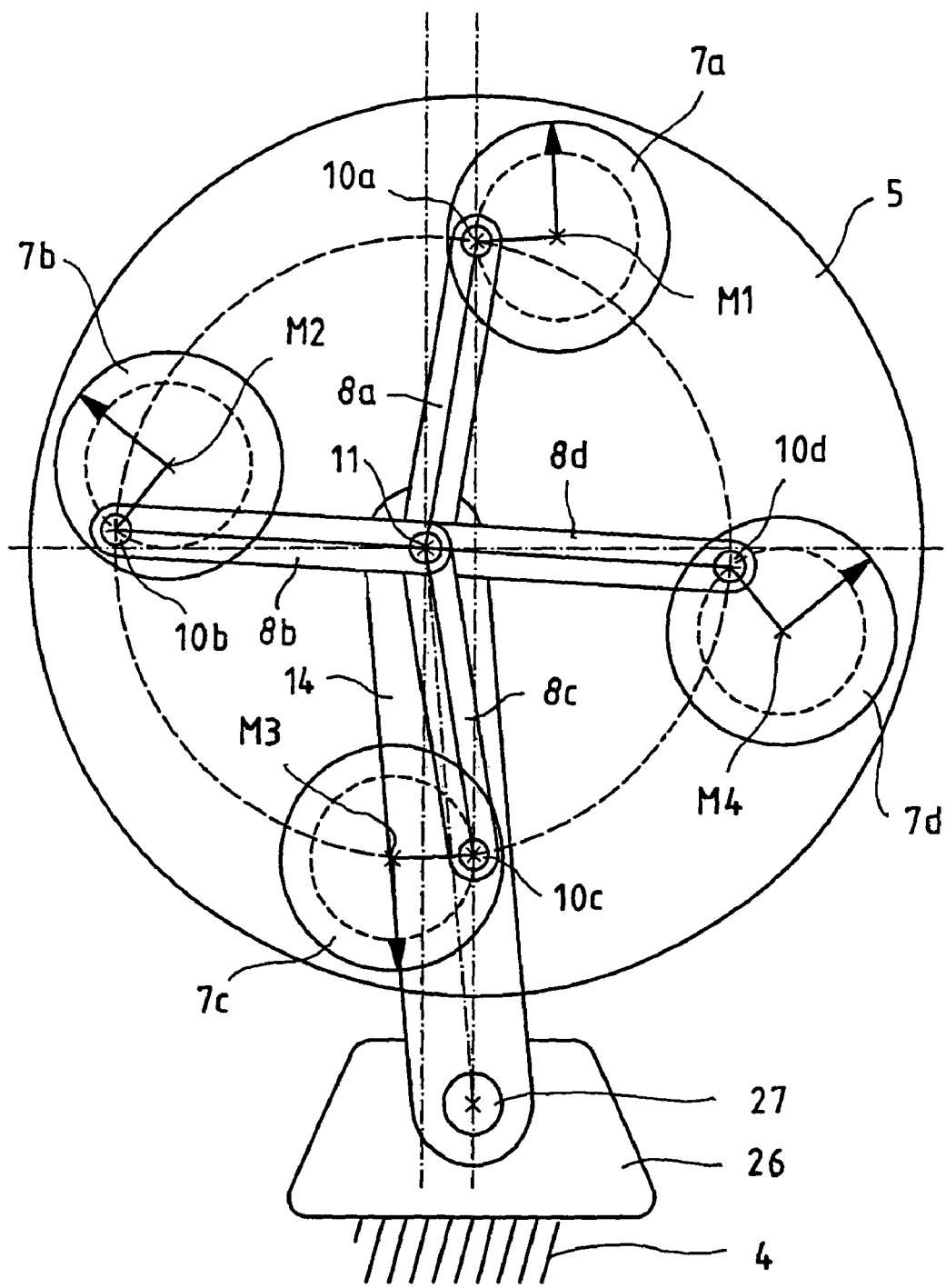
FIG. 2b is a representation corresponding to FIG. 2a of the transmission from FIG. 1 set with a different gear ratio at which the output shaft turns.

FIG. 2b shows the drive disk 5 with the recesses 6a-6d and transmission disks 7a-7d swivel-mounted within them with bearing star point 11 or guide lever 14 deflected by the drive axis AA or the center point M of the drive gear 5. The drive levers 8a-8d depicted by a line and a silhouette indicated by a dotted line are swivel-mounted in a guide sleeve 13 connected with a guide lever 14 and each connected with one of the transmission disks 7a-7d.

Starting from a drive disk 5 rotating counterclockwise, the drive levers 8a-8d follow a deflection movement cyclically forced by the "excentrically" set bearing star point 11. Since the transmission modules 7a-7d are swivel-mounted in the drive disk 5, the guide openings 9a-9d located at the stated distances d1-d4 with respect to the center point M1-M4, and the transmission modules 7a-7d are thus cyclically deflected by the drive levers 8a-8d by a deflection angle ω. The guide openings 9a-9d each describe a circular path with predetermined radii d1 to d4 around the center points or center axes M1 to M4 of the recesses 6a-6d. This oscillation movement is primarily restricted by the fact that the angle at the "knee" between a drive lever 8a-8d and the relevant transmission module 7a-7d, thus at the guide openings 9a-9d, must not exceed the limit values 0° on one side and 1800 on the other side so that the operating state is always defined.

If the center point M of the drive disks 5, 5' and the bearing star point 11 are at a distance or displacement from one another, then the second drive lever 8b, for example, deflects the second transmission module 7b the fastest, and at the same time the fourth drive lever 8d has a strong influence on the rotary motion of the fourth transmission module 7d, but in the opposite direction of rotation. The freewheel 16b connected with the second transmission module 7b transfers this motion to the output shaft 3, specifically by means of the differential transmission module 20. As a result, the rotary speed of the second transmission disk 7b superimposes itself additively or subtractively over the rotary speed transferred by the toothed gear 19 on the drive disk 5'. This process repeats itself cyclically in the example shown over a 360° clockwise rotation.

The inside ring of a freewheel 16a-16d is connected with one of the transmission modules 7a-7d so that when the respective freewheel mechanism 16a-16d is locked, a transfer of the rotary motion of a transmission module 7a-7d takes place by means of the outside toothing on the relevant planet gear 17 to the associated sun gear 18. In the course of a complete 360° rotation of the drive disk 5, the transport movements of each individual transmission module 7a-7d are thus transferred sequentially to the sun gear 19, specifically whenever a transmission module 7a-7d undergoes the fastest relative rotation around its axis M1-M4.

The minimum (or maximum) speed of the sun gear 18 corresponds to the speed of the drive disks 5, 5' (synchronous operation); the maximum (or minimum) speed of the sun gear 18 results from the speed of the drive disks 5, 5' plus (minus) the fastest oscillation rotation of a transmission module 7a-7d. In order to obtain the greatest possible gear ratio range, the speed of the drive disks 5, 5' is subtracted from this speed of the sun gear 18 by means of counter-coupling in the differential 20. If, however, different speeds are selected for the first and second differential ring gear 19, 23 then a "base" speed can be set that can be specified in advance by the speed differential.

The flow of force generated by the pick-up over the freewheels 16a-16d is non-linear, but is subject to harmonics. It can, however, be smoothed using a damping device, such as a centrifugal mass attached between the output of the freewheels 16a-16d and the input of the differential 25, preferably at or before the differential ring gear 19, so that an approximately linear rotary movement that is largely free of harmonics results at the output shaft 3. To this end, damping elements or spring-type actuators could also be added at these points.

Figure 6A:
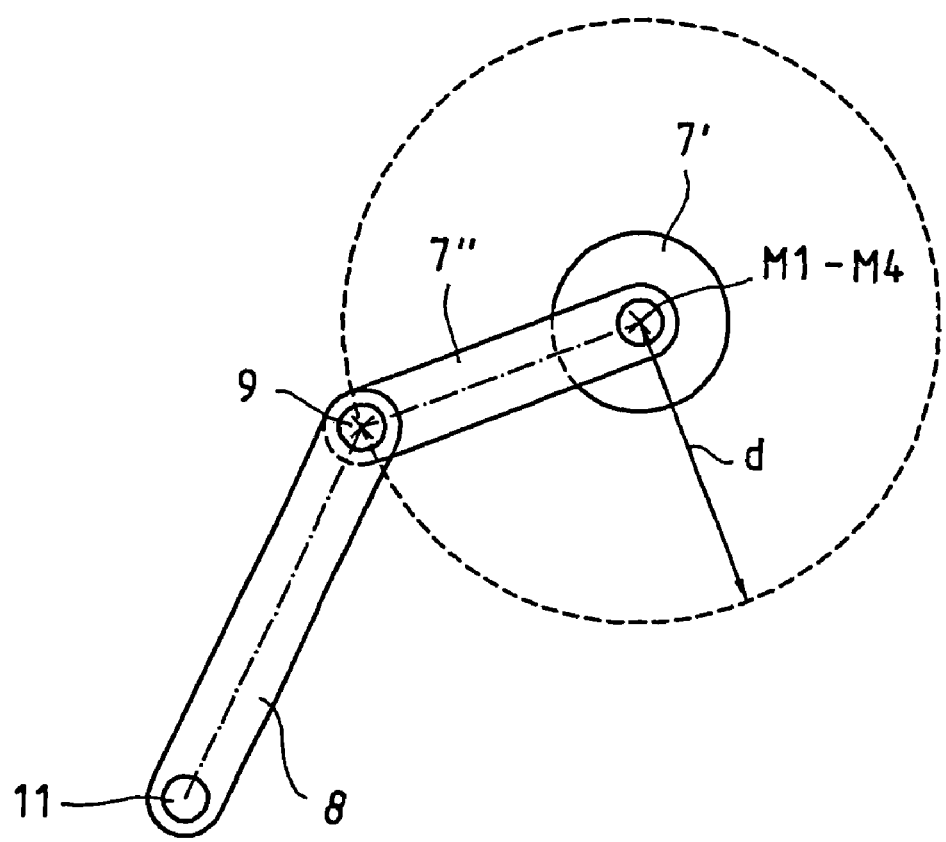
FIG. 6a is a representation corresponding to FIG. 3a with a modified coupling mechanism.

In a second embodiment, illustrated in FIG. 6a, the transmission modules are each designed as transmission rods 7a'-7d' parallel to axis AA with a round cylindrical cross section and each with a further transmission lever 7a"-7d" protruding somewhat radially from it and swivel-mounted around the relevant center point axis M1 to M4. The radii r1 to r4 of the round cylindrical transmission rods 7a'-7d' are significantly reduced compared to the previously mentioned design as transmission disks 7a-7d.

A first end of each transmission lever 7a"-7d" is connected in a rotationally fixed manner with the round cylindrical transmission rod 7a'-7d' and exhibits a guide opening 9a to 9d at a distance d1-d4 from the center point axis M1 to M4. By means of a pin element 9a-9d engaging in a guide opening 9a to 9d at the second end, another drive lever 8a-8d is rotationally connected with each transmission lever 7a" to 7d", and each of the drive levers 8a-8d, together with another associated transmission lever 7a"-7d", comprises a "knee joint lever".

Figure 6B:
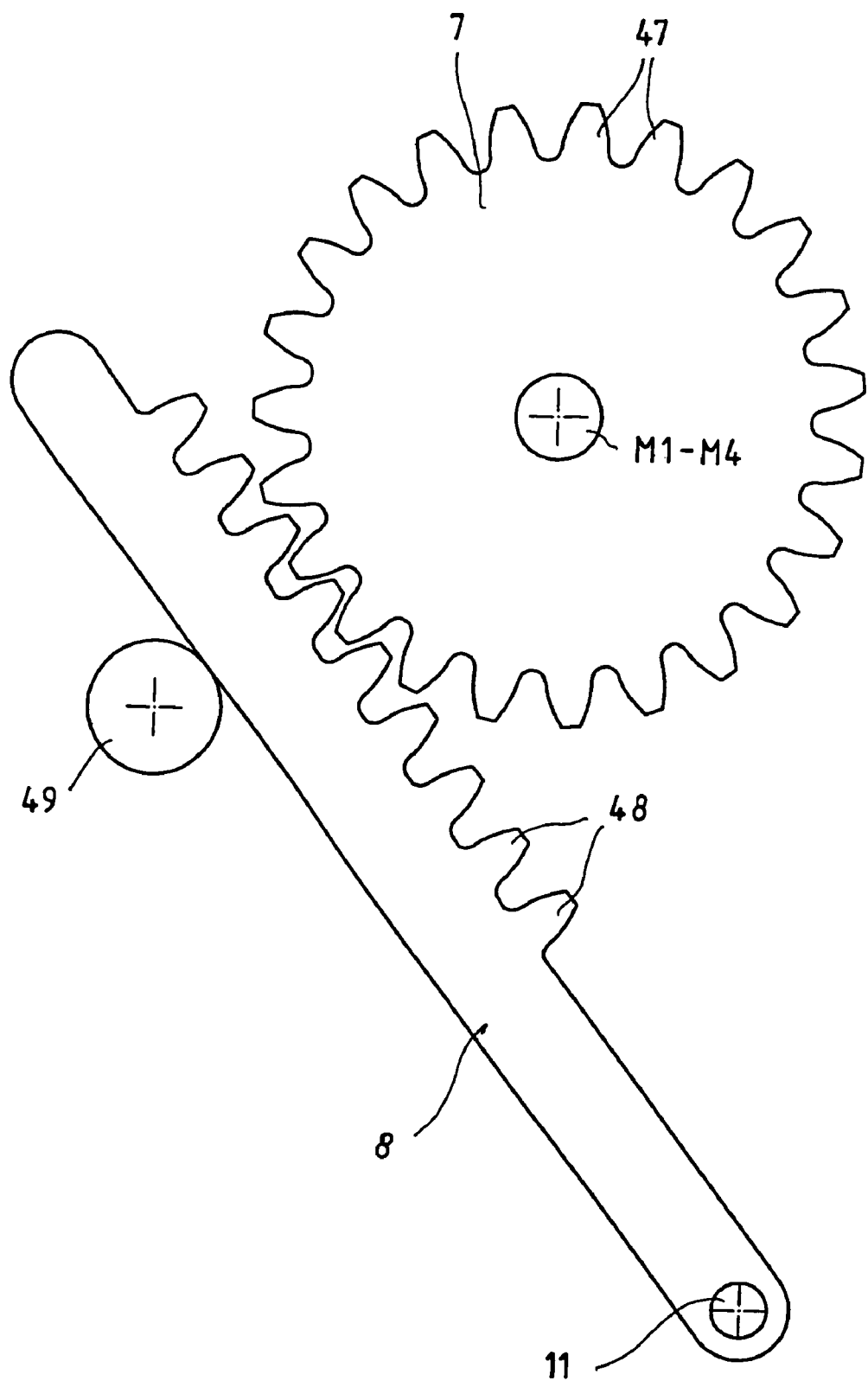
FIG. 6b shows a representation corresponding to FIG. 6a of a different coupling mechanism.

In a third embodiment, illustrated in FIG. 6b, the transmission module 7a-7d, designed as a transmission disk or transmission cylinder, exhibits, at least in its circumferential segment protruding from drive disk 5 in the direction of the drive levers 8a-8d, a toothed ring segment 47 running concentrically to the respective center axis M1-M4, whose teeth protrude perpendicularly from the lateral surface of the cylindrically designed transmission disk 7a-7d. One of the drive levers 8a-8d lies tangentially to the associated transmission disk 7a-7d and exhibits a row of teeth 48 in the lever segment aligned with the transmission disk 8a-8d, whose teeth at least partly engage with the toothed ring segment 47 concentrically surrounding the transmission disk 7a-7d. This forms a working connection between the respective drive lever 8a-8d and the transmission disk 7a-7d associated with it. In order to ensure the constant engagement between the teeth 47, 48 and the two coupling modules 7a-7d; 8a-8d, each drive lever 8a-8d is also guided on the associated transmission module 7a-7d. To this end, each drive lever 8a-8d is provided with a retainer, which secures the working combination with the toothed transmission disk with the radius d1-d4 of the toothed ring. A drive lever 8a-8d can be surrounded by a clamp 49, which is mounted so that it can swivel around the relevant rotational axis M1-M4 on the relevant transmission module 7a-7d.

The radius of the perimeter of a transmission module 7a-7d provided with toothing can also be a function of the angle at circumference, thus it need not be circular or concentric to the relevant axis M1-M4 and can take a sinusoidal contour, for example. The toothed edge of a drive lever 8a-8d can also exhibit a curved contour, so that multiple transfer functions can be realized.

Figure 6C:
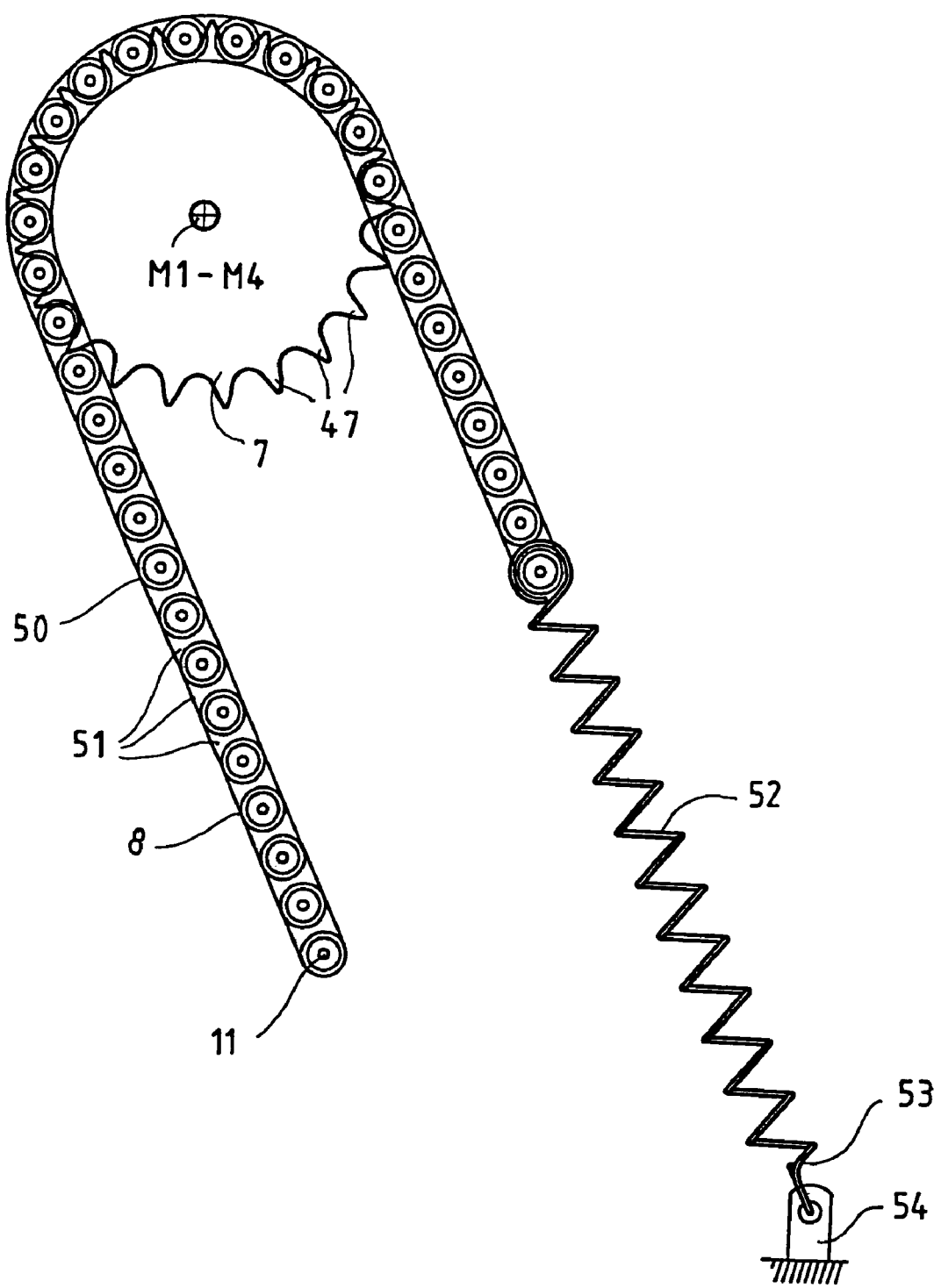
FIG. 6c shows a representation corresponding to FIG. 6a of still another coupling mechanism.

The embodiment of a coupling mechanism according to FIG. 6c is primarily distinguished from that in FIG. 6b in that in place of a drive lever 8 provided with teeth 48, a chain 50 is used, whose individual links 51 are jointed with one another and engage with the toothing 47 of the relevant transmission module 7a-7d. The outermost link 51 at one end is set in the area of the bearing star point M, while the other end link 51 is held under tension by a tension spring 52, whose other end 53 is likewise anchored 54 in the area of the bearing star point 11, and can rotate around this. The chain 50 winds around the chain wheel 7 at an angle of approximately 180°. If the distance between the chain wheel mounting M1-M4 and the bearing star point 11 changes, the spring 52 shortens or lengthens, the chain wheel 7 rolling along the chain 8 and displacing it in an oscillating rotary movement around its center point M1-M4, which is cyclically transferred on to the output 3 by means of the connected freewheels 16a-16d.

As part of another embodiment, another freewheel can be used for the rotary mounting of the drive lever 8a-8d around the guide shaft 12, preferably with an opposing locking direction. Using these additional freewheels, the counter rotary movement generated by the drive lever 8a-8d can be picked up and likewise further used by the transmission. For example, due to its exact opposite running, the counter-rotational movement hereby picked up can be used to provide an "emergency brake function" for the continuously variable transmission 1.

Figure 7A:
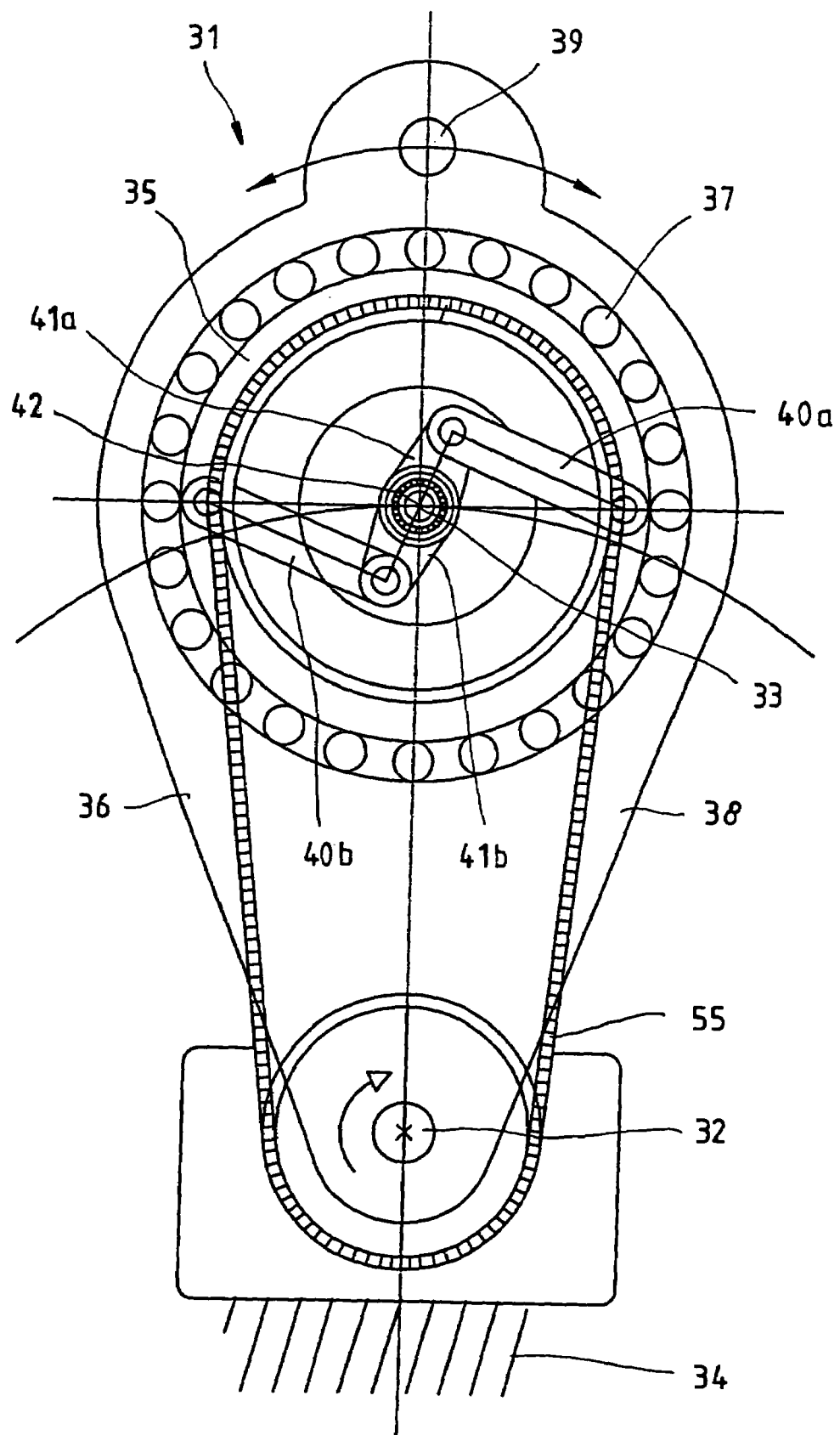
FIG. 7a shows a representation corresponding to FIG. 2a of another embodiment of a transmission according to the invention.
Figure 7B:
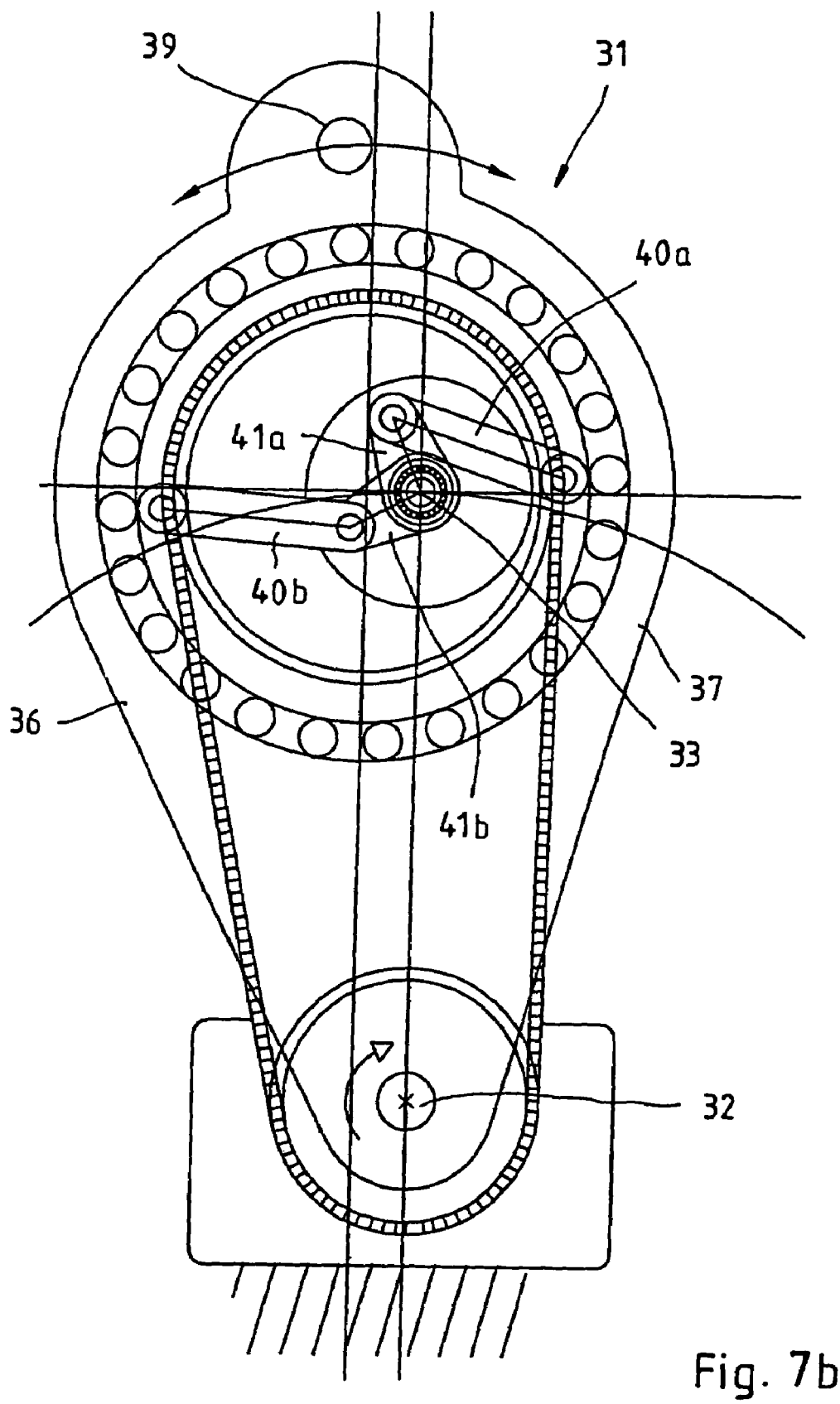
Figure 7C:
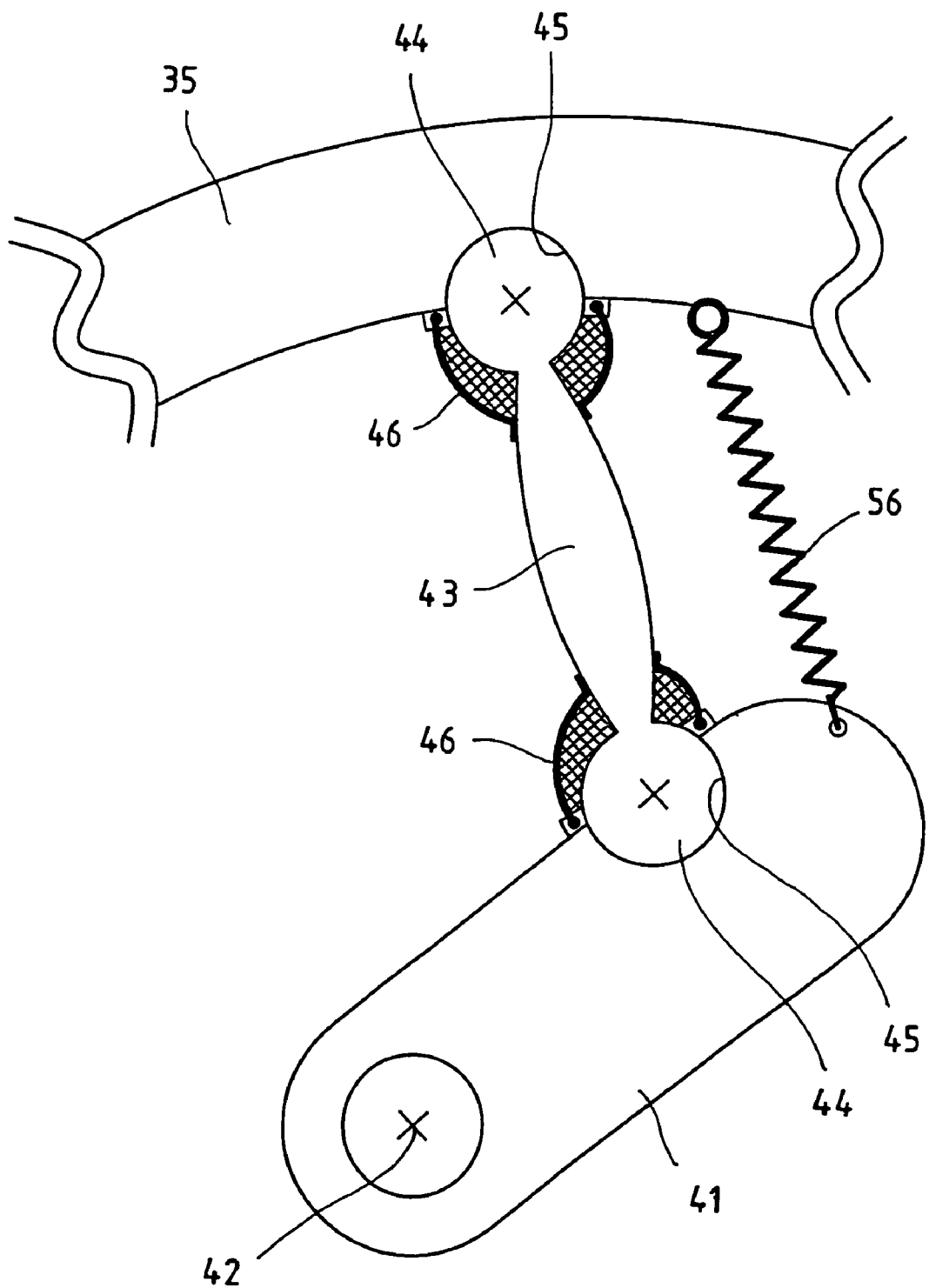
FIG. 7c is a representation corresponding to FIG. 6a of another coupling mechanism, particularly for installation in the transmission according to FIGS. 7a and 7b.

A similar principle is realized in another transmission 31, illustrated in FIGS. 7a to 7c, which likewise serves to convert the speed of a drive shaft 32 to a variable speed of the output shaft 33. To this end, a guide or drive module, preferably in the form of a hollow drum 35 coupled with the drive shaft 32, is swivel-mounted on a chassis 34, which is preferably provided, connected or combined with a housing. The coupling between drive shaft 32 and drive drum 35 can preferably be effected with a continuous chain 55, but possibly also by means of intermeshing toothed gears.

The drive drum 35 is mounted in a lunette 36, preferably in the area of its front sides, by means of one or more rotary roller bearing connections 37, for example. The lunette 36 is mounted on the chassis 34 so that it can swivel around an axis, preferably around the drive shaft 32 or an axis concentric to this. To increase its stability, the lunette 36 can comprise two plates 38, preferably congruent and parallel to one another, which are fastened to one another by means of a crosspiece, preferably along part of its perimeter. One plate 38 preferably has an oblong shape with one thicker end, in which the drive disk 5 is mounted, and one thinner end, with which the lunette 36 is mounted on the drive shaft 32. An eye 39 is provided on its perimeter, preferably in the area of the thicker end, on which a hydraulic cylinder, for example, can act, in order to adjust the lunette 36 with respect to the chassis 34 and the housing.

Multiple (two in the example shown) coupling mechanisms provide adjustable transfer of a rotary motion to the output shaft 33. Each coupling mechanism consists of a knee lever construction with a drive lever 40a-40b and a transmission lever 41a-41b, which are jointed together. The axis of the "knee joint" runs parallel to the rotational axis of the drive drum 35. The free ends of the drive levers 40a-40b are articulated the inside of the drive drum 35, excentric to its rotational axis, preferably diametral to one another or distributed equidistant on the drum perimeter. The free ends of the transmission levers 41a-41b are brought together at a star point 42 and there mounted or guided concentric to one another, such as directly on the output shaft 33 or a shaft concentric to it. The inside end of each transmission lever 41a-41b is furthermore coupled with a common rotary part by means of its own freewheel. These freewheels are preferably displaced against or behind one another in the direction of the output shaft 33.

The rotary movements of these freewheels can be transferred either via their inside rings to a common shaft or they are each coupled in a rotationally fixed manner with a transmission lever 41a-41b by means of sleeves or similar parts inserted in one another and their rotary movements are then superimposed on a common ring gear. Overlay shafts or ring gears are preferably coaxial to the output shaft 33, but separated from it by a differential. The drive speed is conducted to the third connection of this differential, preferably in such a way that the output speed corresponds to the difference of the overlaid freewheel speeds minus the input speed.

For the transmission setup according to FIG. 7a, both coupling mechanisms rotate synchronously with one another without relative movement around the axis 33—the inputs of the output-side differential are subject to equally large speeds, but opposite in direction.

In the transmission setup according to FIG. 7b, a constant relative movement is imposed on the coupling mechanisms by the excentricity between drive drum 35 and drive shaft 33, comparable to the bending and extension of a knee joint. The rotary motion of one transmission lever 41a, 41b is always faster than that of the other, because one always swivels in the rotational direction of the drum 35, while the other is in opposition, i.e., going against the drum's direction of rotation. The faster one also drives the output shaft 33 by means of its freewheel and the differential. When the drum movement is filtered out at the differential, the additional speed of the faster transmission lever 41a, 41b is detectable at the output shaft 33.

FIG. 7c shows a further embodiment of a coupling mechanism for the transmission 31 from FIGS. 7a and 7b. A section of the drive drum 35 can be seen as well as the bearing star point 42, on which a transmission module 41a is mounted as in the embodiment according to FIG. 7a. Instead of an articulated drive lever 40a, the transmission lever 41a is coupled with the drive drum 35 by means of a tappet 43. While a tappet 43 exhibits a ball head 44 on each of its two ends, complementary ball sockets 45 are provided on the transmission levers 41a and the inside of the drive drum 35, resulting in the function of a ball joint. This has a number of advantages. First, significantly greater pressures can be transferred using balls than with joints; furthermore, the boots 46 surrounding the balls 44 can contain a lubricant at the points of articulation, so that the entire transmission interior need not be filled with grease or another lubricant for lubrication; finally such ball joint connections also permit a diagonal orientation of the tappets 43, so that they can be jointed along a shared perimeter line with the drum 35, for example, which may allow for a further reduction in the size of the transmission 35. So that the contact between the tappets 43a, 43b and transmission levers 41a, 41b or between the tappets 43a, 43b and drive drum 35 is not broken on the return stroke of the (non-driving) transmission lever 41a, 41b, each transmission lever 41a, 41b is connected by a tension spring 56 on the perimeter of the drive drum 35. To this end, a retainer plate or hole element, with a hole whose diameter is smaller than the relevant ball 44, and which is affixed, screwed, for example, to the opposite connecting part 35, 41a, 41b, could also be provided.

The invention has been explained above based on an exemplary embodiment. It is understood that numerous changes and modifications are possible without abandoning the underlying inventive concept of the invention. For example, in addition to a central mounting of the transmission function components, i.e., the described mounting of the drive disk(s) 5, 5' and the differential transmission module 20 using a rotationally symmetrical central axis AA with respect to the housing, in which the coupling mechanism is fastened on the opposite side on the housing and the differential gear is arranged in a working combination with the reversing transmission, a decentralized mounting is also conceivable as an alternative, for example, around the toothed gears of the differential transmission module or around the toothed drive disk(s) 5, 5' using rollers or toothed gears for the rotatable fixation of the transmission components.

If the output becomes faster than the connection to the drive disk/drive on which the transfer is based, then traction no longer takes place. If a realization of traction is desired in trailing-throttle condition, this requires the addition of switching devices, which switch the drive and output shafts. As an alternative to this, the use of a retarder brake or a generator to charge a battery is also suitable.

The invention claimed is:

1. A continuously variable transmission (1;31) to transfer a relative rotary motion between at least one first driven rotary part (2;32) and a housing on at least a second driving rotary part (3;33), the transmission comprising:
   a) the first driven rotary part (2;32) or the housing being coupled with a first guide module (5,5';35);
   b) a second guide module (14) being provided;
   c) the two guide modules (5,5',14;35) being connected with the housing of the transmission (1;31) or with an adjacent part rotatably or swivelably mounted thereon, such that the second guide module (14) can be displaced with respect to the first guide module (5,5';35);
   d) the two guide modules (5,5',14;35) being coupled with one another by means of at least two coupling mechanisms, each consisting of a first coupling module (7a-7d) and a second coupling module (8a-8d), which are mounted on one another or mesh with one another;
   e) the first coupling module (7a-7d) of each coupling mechanism being coupled with the first guide module (5,5';35), such that the first coupling module is rotatable around one of several rotational axes (M1,M2,M3,M4)

which are parallel to its rotational straight line but excentric or fixed to one of several fastening points which are excentric to its rotational straight line;

f) the second coupling module (8a-8d) of each coupling mechanism is coupled with the second guide module (14), independent of the second coupling modules (8a-8d) of the remaining coupling mechanisms, mounted such that it can rotate around an axis common to all connected second coupling modules (8a-8d), the common axis not revolving excentrically during operation;

g) and the first coupling module (7a-7d) of each coupling mechanism being mounted on a rotational axis (M1, M2, M3, M4), whose distance from the point of rotation with the associated second coupling module (8a-8d) exhibits a specified radius (d1-d4);

h) the first or second coupling module (7a-7d; 8a-8d) of each coupling mechanism being coupled with at least a first rotary connection of a freewheel (16a-16d), whose other rotary connection is coupled with a third rotary part (18), such that a transport movement of the deflection angle of the rotary movement of the relevant first or second coupling module (7a-7d, 8a-8d) is cyclically transferred to the third rotary part (18), and the rotary axes of the rotary connections of the freewheel (16a-16d) being aligned with one another;

i) and the third rotary part (18) and the first driven and second driving rotary parts (2,3;32,33) being coupled each to different connections (19,23,25) of a differential transmission module (20).

2. The continuously variable transmission according to claim 1, wherein the two coupling modules (7a-7d; 8a-8d) of the coupling mechanism are guided with one another or movably joined with one another (9a-9d), such that a change in distance between the relevant rotational axes (M1,M2,M3,M4) at the first guide module (5,5';35) and the pivot point at the second guide module (14) causes a relative twisting of at least one coupling module (7a-7d; 8a-8d) around its pivot or rotational axis (M1,M2,M3,M4).

3. The continuously variable transmission according to claim 1, wherein the second coupling module (8a-8d) coupled with the second guide module (14) exhibits a surface that is complementary to its rotationally symmetrical guide surface.

4. The continuously variable transmission according to claim 1, wherein the first guide module (5,5';35) exhibits at least two disk-shaped segments parallel to one another.

5. The continuously variable transmission according to claim 4, wherein the second guide module (14) exhibits a rotationally symmetrical guide surface, which is a selected one of convexly and concavely curved.

6. The continuously variable transmission according to claim 5, wherein the second guide module (14) is displaceable with respect to the first driven rotary part and with respect to the rotational axis (AA) of the first guide module.

7. The continuously variable transmission according to claim 1, wherein a surface of a selected one of the first coupling module (7a-7d) and the second coupling module (8a-8d) for coupling with the other one of the first coupling module (7a-7d) and the second coupling module (8a-8d) comprises a selected one of a row of teeth or a friction surface.

8. The continuously variable transmission according to claim 7, wherein a selected one of the first coupling module (7a-7d) and the second coupling module (8a-8d) is adapted to engage with the row of teeth of the other one of the first coupling module (7a-7d) and the second coupling module (8a-8d).

9. The continuously variable transmission according to claim 8, wherein a selected one of the first coupling module (7a-7d) and the second coupling module (8a-8d) is adapted to engage as a toothed gear with the row of teeth of the other one of the first coupling module (7a-7d) and the second coupling module (8a-8d).

10. The continuously variable transmission according to claim 7, wherein at least one coupling module (7a-7d; 8a-8d) comprises a link chain.

11. The continuously variable transmission according to claim 1, wherein a freewheel is arranged on a selected one of the first coupling module (7a-7d) and the second coupling module (8a-8d) of each coupling mechanism.

12. The continuously variable transmission according to claim 11, wherein rotary movements of the selected one of the first coupling modules (7a-7d) and the second coupling modules (8a-8d) coupled with a one common guide module selected from the first guide module (5,5';35) and the second guide module (14) are combined to coupling mechanisms beyond the freewheels (16a-16d).

13. The continuously variable transmission according to claim 12 wherein toothed planet gears (17) which mesh with a toothed sun gear are provided beyond the freewheels (16a-16d).

14. The continuously variable transmission according to claim 12, wherein all freewheels (16a-16d) are oriented such that the fastest rotary movement in a shared orientation direction of rotation is transferred.

15. The continuously variable transmission according to claim 1, wherein the second coupling module (8a-8d) of each coupling mechanism coupled with the second guide module (14) comprises a lever.

16. The continuously variable transmission according to claim 15, wherein the levers (8a-8d) of each coupling mechanism being mounted such that they rotate independently of one another around the rotational axis of a rotationally symmetrical guide surface of the first guide module.

17. The continuously variable transmission according to claim 16, wherein the levers (8a-8d) each exhibit a bearing sleeve (13) for the independent mounting of a guide surface such that the lever rotates around a guide axis (12).

18. The continuously variable transmission according to claim 16 wherein the levers (8a-8d) each exhibit a projecting sleeve (13) of different cross sections that mesh with one another in the area of the guide surface belonging to the second guide module (14) in a bearing star point (11) perpendicular to the lever (8a-8d) for the independent mounting of a guide surface such that it rotates around the rotational axis, in particular a guide axis (12).

19. The continuously variable transmission according to claim 16, wherein on each first coupling module (7a-7d), that is coupled with the first guide module (5,5';35), there is provided, excentrically to its rotational axis (M1,M2,M3,M4), a surface, which runs parallel to the rotational axis (M1,M2,M3,M4), for coupling with the lever (8a-8d).

20. The continuously variable transmission according to claim 1, wherein the first guide module (5,5';35) is mounted such that the first guide module can rotate around a rotational axis (AA) with respect to the transmission housing.

21. The continuously variable transmission according to claim 20, wherein the first guide module (5,5';35) is coupled in a rotationally fixed manner with a a selected one of the first driven rotary part (2;32) and the second driving rotary part (3;33).

22. The continuously variable transmission according to claim 20, wherein the first guide module (5,5';35) exhibits at least one segment of the shape of a disk, whose base plane is crossed by the rotational axis (AA) generally perpendicularly.

23. The continuously variable transmission according to claim 20, wherein the first coupling module (7a-7d) of each coupling mechanism coupled with the first guide module (5,5') crosses at least one disk-shaped segment of the first guide module (5,5') excentrically to the rotational axis (AA).

24. The continuously variable transmission according to claim 20, wherein the first coupling module (7a-7d) of each coupling mechanism coupled with the first guide module (5,5') is mounted in at least one disk-shaped segment of the first guide module (5,5') such that it can rotate around one of its own rotational axes (M1,M2,M3,M4) excentric to the rotational axis (AA) of the first guide module (5,5').

25. A continuously variable transmission (1;31) comprising at least a first rotary part, and a second rotary part (33),
  a) the first rotary part being coupled with a first guide module (5,5';35);
  b) a second guide module comprising a guide lever;
  c) the first and second guide modules (5,5'14) being connected with a selected one of a housing of the transmission (1;31) and an adjacent installation part rotatably mounted thereon, such that the second guide module can be displaced with respect to the first guide module;
  d) the two guide modules (5,5',14;35) being coupled with one another by means of at least two mechanisms, each mechanism comprising a first coupling module (7a-7d) and a second coupling module (8a-8d) mounted (9a-9d) on one another;
  e) the first coupling module (7a-7d) of each of the coupling mechanisms being coupled with the first guide module, such that it rotates around one of several rotational axes (M1,M2,M3,M4) which are parallel to its rotational straight line but excentric, or fixed to one of several fastening points which are excentric to, its rotational straight line;
  f) while the other coupling module (8a-8d) of each of the coupling mechanisms is coupled with the second guide module (14), independent of the coupling modules (8a-8d) of the remaining coupling mechanisms, mounted such that it can rotate around an axis (11) common to all connected coupling modules (8a-8d, the common axis (11) not revolving excentrically during operation;
  g) the first coupling module (7a-7d) of each coupling mechanism being mounted on a rotational axis (M1,M2, M3,M4), whose distance from the point of contact with the associated, second coupling module (8a-8d) exhibits a specified radius (dl-d4);
  h) a selected one of the first and the second coupling module (7a-7d; 8a-8d) of each coupling mechanism being coupled with at least a first rotary connection of a freewheel (16a-16d), whose other rotary connection is coupled with a second rotary part (18), such that a transport movement of a deflection angle of the rotary movement of the relevant first or second coupling module (7a-7d, 8a-8d) is cyclically transferred to the second rotary part, and the rotary axes of the rotary connections of the freewheel (16a-16d) are aligned with one another; and
  i) the second rotary part, and the first rotary parte are coupled each to different connections (19,23,25) of a differential transmission module (20);
  wherein the change in the distance between the rotational axis (M1,M2,M3,M4) at the first guide module (5,5';35) and the pivot point at the second guide module (14) during a revolution of the guide modules (14;5,5';35) around one another, or around the excentric rotary axis, results in a relative twisting of at least one of the first and the second coupling modules (7a-7d; 8a-8d), around its rotational axis (M1,M2,M3,M4).

26. The transmission according to claim 25, wherein the rotational movement transferred to the coupling module (7a-7d), is transferred by means of the respective associated freewheel (16a-16d) on the second rotary part, or on a differential transmission module (20) connected before it.

27. The transmission according to claim 25, wherein a bearing star point of the second guide module (14), is deflected from a base position in order to vary the gear ratio, with the result that the amplitude of the rotational movement, which at least one of the first and the second coupling modules (7a-7d; 8a-8d) undergoes, changes by means of the drive lever.

28. The transmission according to claim 27, wherein the gear ratio of the continuously variable transmission (1;31) depends on deflection of the bearing star point (11) from the drive axis (AA) of the first guide module (5;5';35).

29. The transmission according to claim 27, wherein in a base position, the gear ratio of the transmission (1;31) equals zero.

30. The transmission according to claim 29, wherein in the base position, the bearing star point (11) aligns with the rotational axis (AA) of the first guide module (5;5')

* * * * *